April 28, 1959     R. H. DICKE     2,884,524
METHOD AND SYSTEM EMPLOYING PHOTON ABSORPTION
BY A MICROWAVE RESONANT MEDIUM Filed Aug. 1, 1955     2 Sheets-Sheet 1

INVENTOR.
ROBERT H. DICKE
BY
ATTORNEY

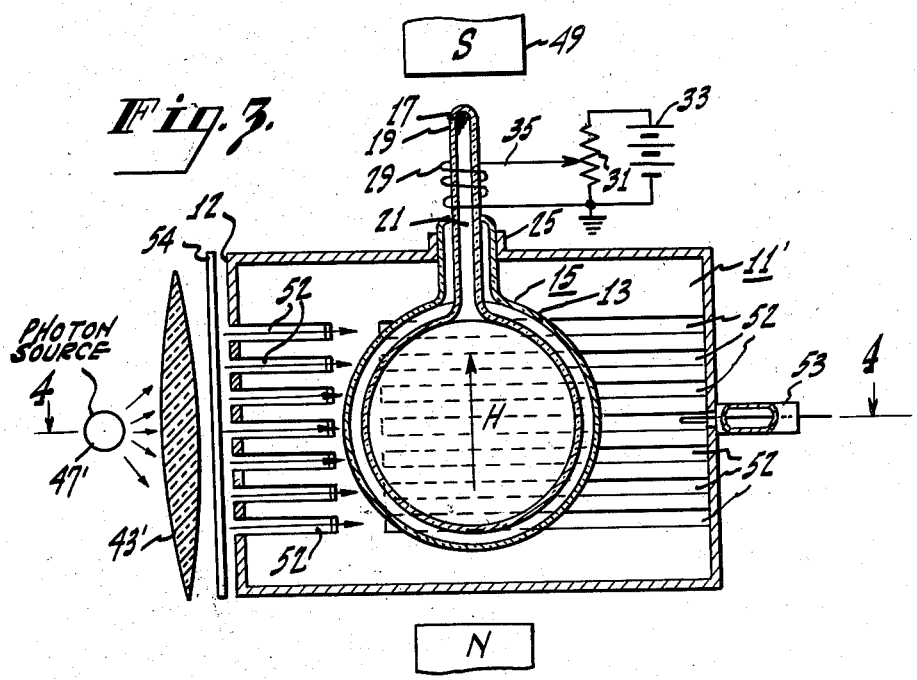
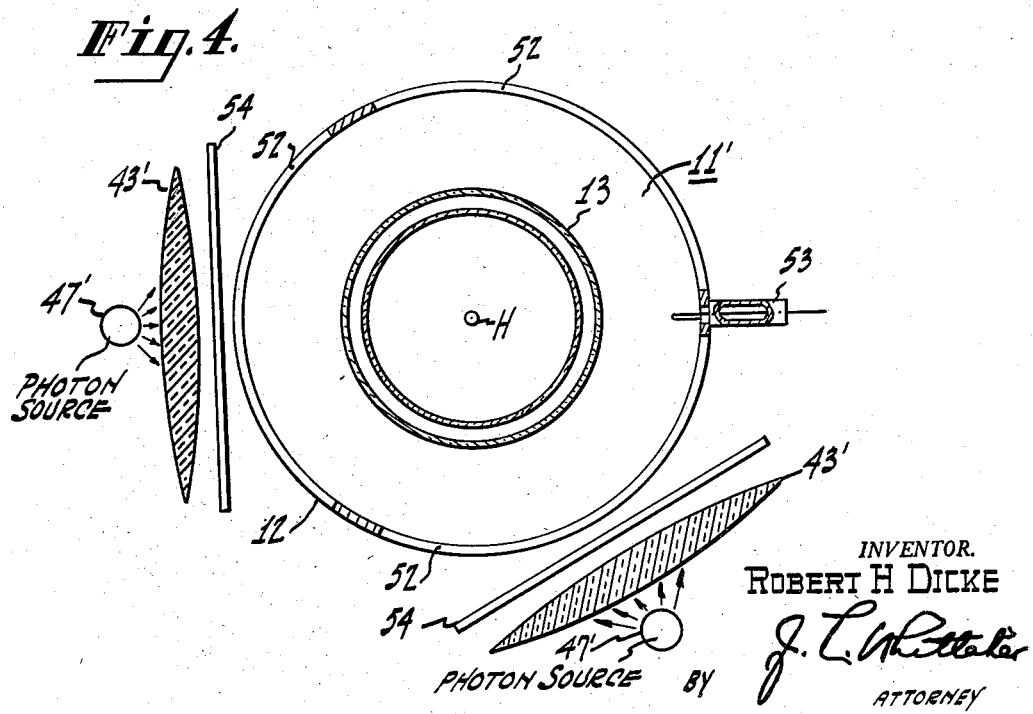

2,884,524

Patented Apr. 28, 1959

2,884,524

METHOD AND SYSTEM EMPLOYING PHOTON ABSORPTION BY A MICROWAVE RESONANT MEDIUM

Robert H. Dicke, Princeton, N.J.

Application August 1, 1955, Serial No. 525,441

46 Claims. (Cl. 250—36)

This application is a continuation-in-part of my co-pending application, Serial No. 497,668, filed March 29, 1955, now abandoned.

The invention relates generally to systems employing microwave resonant media and particularly to improved methods of and means for increasing the intensity of a spectral line exhibited by a microwave resonant medium by a photon excitation phenomenon which produces an increased population of preferred atomic or molecular quantum states. In accordance with the invention, the particles in these preferred atomic or molecular quantum states may be used in microwave spectroscopy and frequency stabilization systems, or for microwave energy generation or amplification.

Spectral lines in the microwave region of the radio frequency spectrum are not as intense as might be desired, primarily because of the small population differences between certain quantum energy levels of atoms or molecules. At 25,000 megacycles per second, for example, where ammonia gas may be the resonant medium employed, at room temperature the ratio of the difference of the energies of the two energy levels involved, compared to $kT$, is only about $4 \times 10^{-3}$. For transitions where the electronic and nuclear spins of $Na^{23}$ is involved, the frequency of the spectral line is about 1,771 megacycles per second and the per unit population difference of the energy levels concerned is approximately $2.8 \times 10^{-4}$. For other resonant media and frequencies the per unit population difference of energy levels of interest is even less desirable.

An object of the invention is to provide an improved method of and means for utilizing a microwave resonant medium.

Another object of the invention is to increase the intensity of a spectral line of a microwave resonant medium by a photon excitation phenomenon.

Another object of the invention is to provide an improved method of and means for utilizing a microwave resonant medium for microwave spectroscopy and/or frequency stabilization.

Another object of the invention is to provide an improved method of and means for utilizing a microwave resonant medium for generating electrical energy.

A further object of the invention is to provide an improved method of and means for utilizing a microwave resonant medium for amplifying electrical energy.

A further object of the invention is to improve the signal-to-noise ratio of systems in which microwave resonant media are employed.

A still further object of the invention is to produce a spectral line of increased intensity and reduced bandwidth.

The foregoing objects and advantages are achieved in accordance with the invention by improving the small population differences which are due to thermal equilibrium disorder by selecting as preferred at least one allowed energy and angular momentum state of the atom. Preferential population of the preferred quantum state or states effectively results in intensification of the selected spectral line.

Briefly, the preferential energy state population referred to above is achieved by subjecting a microwave resonant medium, such as $Na^{23}$, contained within a hollow wave energy structure such as a cavity resonator, to either unpolarized, circularly polarized, or plane polarized photon energy (preferably resonance radiation). The incident photon energy passes through one or more slots in one of the resonator walls and causes certain energy level transitions to occur between magnetic substates of at least a pair of quantum energy states of the vapor. The magnetic substates are made definite by applying a weak magnetic field of definite direction to the resonant medium. The photon induced transitions are followed by spontaneous "drop-down" transitions from magnetic substates of the higher energy state to magnetic substates of the lower energy state. The net result of the photon induced and drop-down transitions is that the populations of certain magnetic substates of the lower energy state are enhanced at the expense of the populations of other magnetic substates in the same energy level. The enhancing of the population of one or more magnetic substates at the expense of one or more other magnetic substates to a large extent brings order to the thermal equilibrium disorder mentioned previously, and enables the microwave resonant medium to be used more efficiently for microwave spectroscopy, frequency stabilization, or for the generation or amplification of microwave energy.

Since the intensity of the spectral line of interest is greatly enhanced by means of the photon absorption phenomena briefly described above, in some instances it may be desirable to sacrifice a portion of the increased line intensity for a reduction in the spectral line bandwidth. In these instances, the Doppler breadth of the spectral line may be reduced, in accordance with a further feature of the invention by mixing a buffer gas with the microwave resonant medium. In such case the partial pressure of the buffer gas is high compared to the partial pressure of the microwave resonant medium. While the conditions for a Doppler reduced bandwidth spectral line are such as to give a spectral line of reduced intensity, the line intensity still is considerably greater than would be the case if photon induced transitions were not caused to occur.

The invention will be described in detail with reference to the accompanying drawing in which.

Similar reference characters are applied to similar elements throughout the drawing.

*Structure*

Figure 1:
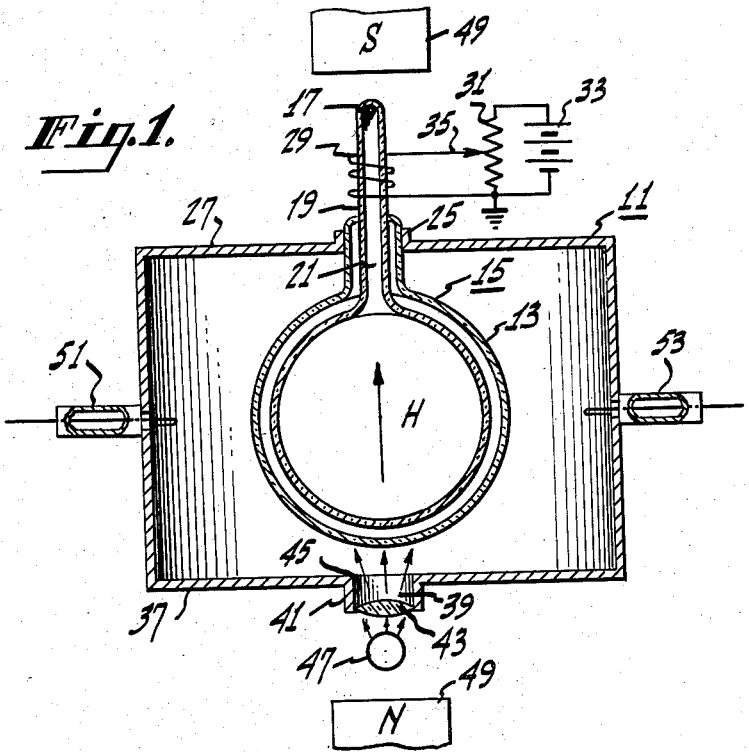
Figure 1 is a schematic sectional diagram of a first embodiment of the invention, illustrated in cross-section, of apparatus employing photon induced transitions for producing preferential population of certain quantum energy states.

Referring to Figure 1, a cavity resonator 11 is shown which may be operated in the $TE_{01}$ mode. The material from which the resonator 11 is formed should be non-magnetic, for example, copper or aluminum. The resonator 11 may be cylindrical in shape and contains therein the bulb portion 13 of an envelope 15. The envelope 15 may comprise, for example, a double walled Dewar flask which contains a microwave resonant medium. The resonant medium, further by way of example, may comprise a gas such as ammonia or vapors such as $Na^{23}$ or $Cs^{133}$ (fluids), or materials such as CHI·CHI (methyl iodide) or $I_2$ (iodine) which are solids at room temperature and pressure.

In the instant embodiment it is assumed that sodium ($Na^{23}$) has been chosen as the resonant medium. However, the other resonant media mentioned above may be used alternatively.

The metallic liquid sodium 17 is located in the neck portion 19 of the envelope 15. The neck portion 19 is outside the resonator 11 and extends into the resonator through an aperture 21 and collar 25 in the top wall of the resonator 11. A heating element 29 is disposed about the neck portion 19 near the top thereof and is supplied with current by potentiometer 31 and battery 33. Adjustment of the potentiometer arm causes an increase or a decrease in the current flowing through the heater element 29 and thereby either increases or decreases the pressure of the sodium vapor in the bulb portion 13. In the present example the sodium vapor pressure is adjusted to be not more than $10^{-2}$ millimeters of mercury and preferably is between $10^{-4}$ and $10^{-6}$ millimeters of mercury.

The bottom wall 37 of the resonator 11 also includes an aperture 39 and collar 41. In this instance, however, a lens 43 is disposed adjacent the aperture 39 and, if desired, may be supported by the inner surface 45 of the collar 41. The lens 43 focuses photon excitation energy, emanating from a sodium-D lamp 47, onto the confined sodium vapor in the envelope bulb portion 13. Sodium-D lamps suitable for use in connection with the structure set forth above are commercially available.

If a resonant medium other than sodium is utilized it is to be understood that a different type lamp is required. For example, if cesium is employed as the resonant medium, a cesium lamp is necessary to provide the requisite photon excitation.

A D.-C. magnetic field is impressed on the vapor by means of a permanent magnet 49 or by electromagnetic means if more convenient. The magnetic field may be approximately 0.1 gauss and is for the purpose of resolving the degeneracy of the magnetic substates of the sodium vapor. The magnetic lines of force H are normal to the top and bottom resonator walls 27 and 37.

Coupling loops 51 and 53 are provided for coupling microwave energy into and out of the resonator, respectively, at frequencies at which the medium is resonant. Although two coupling loops are illustrated it should be appreciated that in some instances a single coupling number may be utilized both for introducing energy into the resonator and withdrawing energy from the resonator. The frequencies at which the medium is resonant are determined by the differences in energy levels of two selected magnetic substates. For $Na^{23}$ the frequency may be 1,771 megacycles per second, whereas for $Cs^{133}$ the frequency may be 9192.6 megacycles per second.

Theory of operation

Figure 2:
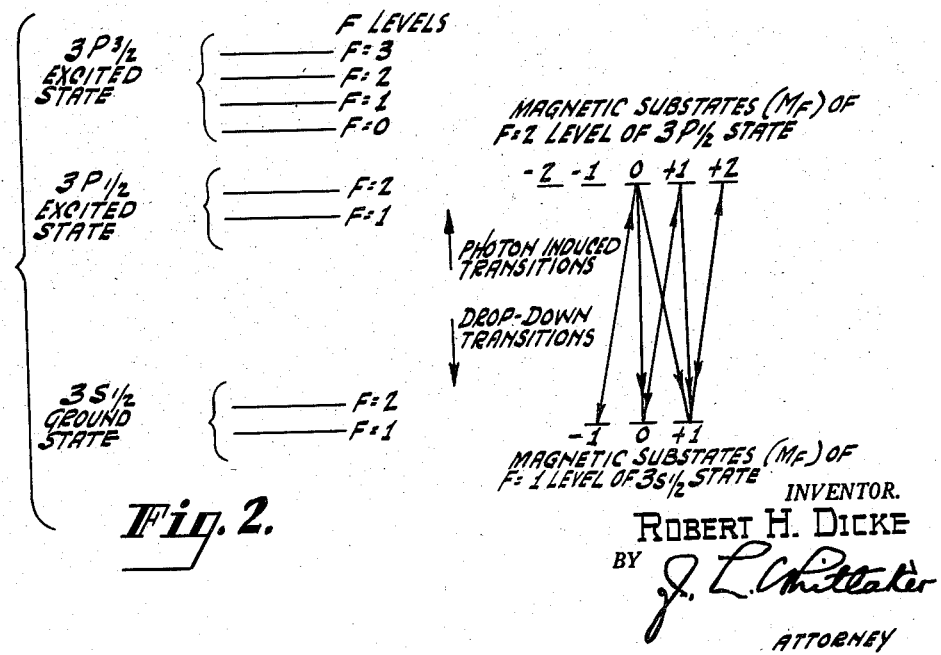
Figure 2 is an energy level diagram of transitions which are permitted to occur between various quantum energy states in accordance with the invention; and, Figures 3 and 4 are front and plan views, respectively, of a second embodiment of the invention.

The operation of the structure described in the foregoing paragraphs is believed to be as follows. The sodium atoms initially are in a $3S_{1/2}$ ground state. Considering that the nuclear spin I is 3/2, the permitted magnetic substates of the $F=1$ energy level of the $3S_{1/2}$ ground state and the permitted magnetic substates of the $F=2$ energy level of the $3P_{1/2}$ excited state are as shown in Figure 2. The degeneracy of these magnetic substates is resolved by application to the vapor of the weak magnetic field H.

The photon energy of the sodium-D lamp is just sufficient to excite the microwave resonant sodium vapor in the envelope 15 to induce energy level transitions from magnetic substates ($M_F$) of the $F=1$ level of the $3S_{1/2}$ ground state to magnetic substates ($M_F$) of the $F=2$ level of the $3P_{1/2}$ excited state.

Assuming that the sodium-D excitation is circularly polarized and is polarized in a right hand sense, i.e., clockwise, the induced transitions follow a selection rule of $\Delta m=+1$. If the sodium-D excitation is polarized in the reverse sense, i.e., counter-clockwise, the photon induced transitions follow the selection rule $\Delta m=-1$.

With the photon excitation polarized in the right hand sense, and with the magnetic field H applied to the vapor to resolve degeneracy of the magnetic substates, induced transitions occur between the magnetic substate $M_F=-1$ of the $F=1$ level of the $3S_{1/2}$ ground state and the magnetic substate $M_F=0$ of the $F=2$ level of the $3P_{1/2}$ excited state. The induced transitions are followed by spontaneous drop-down transitions to any of the magnetic substates $M_F=-1$, $M_F=0$, $M_F=+1$ of the $F=1$ level of the $3S_{1/2}$ state. Similarly, photon induced transitions from the $M_F=0$ substate of the $F=1$ level of the $3S_{1/2}$ ground state to the $M_F=+1$ substate of the $F=2$ level of the $3P_{1/2}$ excited state occur and are followed by drop-down transitions to the $M_F=0$ and $M_F=+1$ substates of the $F=1$ level of the $3S_{1/2}$ state. Also, photon induced transitions from the $M_F=+1$ substate of the $F=1$ level of the $3S_{1/2}$ state to the $M_F=+2$ substate of the $F=2$ level of the $3P_{1/2}$ state result which are followed by drop-down transitions to the $M_F=+1$ substate of the $F=1$ level of the $3S_{1/2}$ state.

As a result of the above described photon induced transitions and the ensuing drop-down transitions, the number of sodium atoms in the $M_F=0$ magnetic substate of the $F=1$ level of the $3S_{1/2}$ state is enhanced at the expense of the $M_F=-1$ substate of the $F=1$ level of the $3S_{1/2}$ state. The new population distribution comprises a preferred angular momentum orientation in which the original population difference of the $M_F=0$ substates in the $F=2$ and $F=1$ levels of the $3S_{1/2}$ state is enhanced by several orders of magnitude. In thermal equilibrium the population difference of the substates concerned is only about 0.01% whereas after a single photon of sodium-D excitation is absorbed by each sodium atom the population difference is approximately 10%. After photon excitation the populations of the $M_F=1$ substates for the $F=1$ and $F=2$ levels, the $3S_{1/2}$ state are 0.119 and 0.106, respectively. This represents a $10^6$ fold increase in spectral line intensity.

Since the intensity of the selected spectral line effectively is increased in intensity in accordance with the method described above, the signal-to-noise ratio of the system in which the apparatus is employed is considerably improved, whether the system be one for providing microwave spectroscopy or frequency stabilization. The apparatus may be coupled into such systems by means of the resonator input and output coupling loops 51 and 53, respectively. Alternatively, in some instances it may be desirable to utilize a single coupling loop both for introducing input energy into the resonator and for withdrawing output energy therefrom. The frequency of the monochromatic excitation applied to the resonator 11 by the input coupling loop is determined by the energy levels of the $M_F=0$ magnetic substates of the $F=1$ and $F=2$ levels of the $3S_{1/2}$ state. As indicated previously, for $Na^{23}$ this frequency is 1,771 megacycles per second and for $Cs^{133}$ the frequency is 9,192.6 megacycles per second. For other spectral lines of the resonant medium the resonator tuning and the frequency of the microwave excitation energy are different.

Although the foregoing description has been directed to an embodiment of the invention in which circularly polarized light is used to induce transitions, it is emphasized that the structure also affords a spectral line of greatly increased intensity when a source of unpolarized or plane polarized photon energy is employed. The unpolarized source of radiation can be considered to be radiating a mixture of photons which are individually circularly polarized; half of them, on the average, being polarized with one sense of rotation, the remainder being oppositely polarized. As the radio frequency transition from $M_F=0$ substate of the $F=2$ level of the $3S_{1/2}$ state to the $M_F=0$ magnetic substate of the $F=2$ level of the $3S_{1/2}$ state is unaffected by the sense of rotation of the illuminating light, unpolarized sodium light will be just as effective as circularly polarized light, providing that single photon transfers are the most frequent. Also, because of magnetic degeneracy having been split by a static magnetic field H, the illumination may be plane polarized.

Additional structure

Figures 3 and 4 show another embodiment of the invention which particularly is useful for the generation or amplification of the microwave electromagnetic energy. In this instance the resonator 11' (which again is operated in the $TE_{01}$ mode) is illuminated with photon energy through the resonator side wall 12. The wall 12 includes a plurality of rows of slots 52, for example, three, each of which encompasses an angle of about 100° to 110° about the periphery of the wall 12. A photon source 47' is located adjacent at least one of the slotted sections of the wall 12. In some instances it may be desirable to position a photon source adjacent each such slotted wall section to increase the intensity of photon excitation. A lens 43' and a polaroid screen 54 are disposed between each photon source employed and the resonator wall. The envelope containing the microwave resonant medium is located within the resonator 11' and is situated therein as described previously with reference to Figure 1. Since the resonant medium is illuminated with photon excitation through the resonator side wall rather than from below, as was shown in Figure 1, the second aperture 39 and collar 41 shown in that figure are not required.

When the polaroid screen 54 is oriented to produce polarization of the photon energy with its electric vector extending into or out of the plane of the paper, i.e., the direction of the electric vector of the photon excitation is normal to the direction of the magnetic field H, a single photon absorbed by each sodium atom induces populations of 0.119 and 0.106, respectively, for the $M_F=0$ substates of the $F=1$ and $F=2$ levels of the $3S_{1/2}$ ground state. This is the same state population as afforded in the apparatus of Figure 1 when unpolarized photon excitation is employed therein, or when polarized radiation is employed under conditions of sufficiently low intensity. In such a situation the apparatus of Figures 3 and 4 may be utilized for microwave spectroscopy and/or frequency stabilization.

In the present instance, however, it is preferred to differently orient the polaroid screen 54 so that the electric vector of the photon energy extends in the same direction as the magnetic field H. Under these conditions, absorption of a single photon by each sodium atom provides populations of 0.137 and 0.163, respectively, for the magnetic substates $M_F=0$ of the $F=1$ and $F=2$ levels of the $3S_{1/2}$ state.

It is particularly important to note here that the upper of the two energy levels is more densely populated (0.163) than the lower energy level (0.137). This results in the vapor being in what may be termed a condition of "negative attenuation." In such condition the sodium vapor no longer absorbs microwave energy at a frequency for which the vapor is resonant but now coherently radiates or emits energy at this frequency. With the intensity of the coherent radiation of emission sufficient to exceed the usual cavity resonator losses, the overall attenuation of the structure is negative and the structure amplifies microwave energy applied to the vapor at a frequency at which the atoms of the vapor are resonant. During the amplification process output energy is derived from the resonator 11' at a rate equal to the sum of the rates at which input energy is applied to the resonator and the rate at which elecromagnetic energy is generated in the resonator by the quantum transition process. Stated in another way, the terminal impedance of the cavity resonator, as measured at the coupling loop of the transmission line 53, has a negative real part. Although the amplifier is shown as having only a single coupling loop for applying input energy from the resonator 11' at a resonance frequency of the vapor, it should be appreciated that separate coupling means may be employed with equal facility.

In the event that oscillation generation rather than amplification is desired, the cavity resonator 11' is strongly decoupled with respect to its associated load circuit (not shown). With the populations of the $M_F=0$ substates of the $F=1$ and $F=2$ levels 0.137 and 0.163, as mentioned above, the sum of the positive and negative attenuations of the apparatus is negative. This results in the spontaneous build-up of the electromagnetic oscillations within the resonator at a resonance frequency of the vapor. With the electromagnetic energy withdrawn from the resonator at a rate which is slower than the rate of build-up of the oscillations, the device generates microwave energy. The generated microwave energy may be coupled therefrom by the transmission line 53.

If desired the contribution of the cavity resonator wall losses to positive attenuation may be sharply reduced by cooling the resonator walls.

Doppler breadth reduction

In view of the fact that the photon excitation phenomenon affords a spectral line of greatly increased intensity, in some instances it may be desirable to trade some of the increased line intensity for a line of narrower bandwidth. In these instances, and in accordance with a further feature of the invention, a small quantity of a buffer gas, for example, a noble gas such as helium or argon, is introduced into the envelope containing the resonant medium and mixed therewith. The partial pressure of the resonant medium preferably is less than $10^{-4}$ millimeters of mercury, as described previously, whereas the partial pressure of the noble gas preferably is several orders of magnitude greater, for example, a pressure of approximately one millimeter of mercury. The atoms of the noble gas effectively provide a long diffusion time for the particles or atoms of the resonant medium before they strike the walls of the envelope. This is because the resonant particles or atoms strike the nobel gas atoms before they strike the envelope walls. In terms of the wavelength associated with magnetic dipole microwave transitions of the particles or atoms of the resonant medium the mean free path is small.

For the particular microwave resonance associated with sodium, hydrogen, and a number of other microwave resonant materials, the collision between an atom of the resonant medium and an atom of the noble gas causes negligible disturbances to the resonating atom. On the other hand a collision between two atoms of the resonant medium does disturb the resonance. Consequently, to achieve a sharp resonance such as is desirable in a frequency standard a long uninterrupted resonance period for the resonating atom is desirable. This necessitates a low concentration of atoms of the resonant medium as well as a long diffusion time to the container walls. The resulting loss of signal intensity is compensated by the effect of illuminating with the proper optical radiation as previously described.

What is claimed is:

1. A method of utilizing a microwave resonant medium comprising, irradiating a microwave resonant medium with photon energy to produce photon induced transitions between quantum energy states of said medium, and electrically coupling to said medium.

2. A method of utilizing a microwave resonant medium comprising, irradiating a microwave resonant medium with photon energy to produce photon induced transitions between quantum energy states of said medium, applying a magnetic field to said irradiated medium, and electrically coupling to said medium.

3. A method of utilizing a microwave resonant medium comprising, irradiating a microwave resonant medium with photon energy to produce photon induced transitions between quantum energy states of said medium, and deriving electrical energy from said microwave resonant medium at a frequency at which said medium is resonant.

4. A method of utilizing a microwave resonant medium comprising, irradiating a microwave resonant medium with photon energy to produce photon induced transitions between quantum energy states of said medium, applying a magnetic field to said irradiated medium, and deriving electrical energy from said microwave resonant medium at a frequency at which said medium is resonant.

5. A method as claimed in claim 4 wherein the electric vector of said photon energy is parallel to the lines of force of said magnetic field.

6. A method of amplifying electrical energy comprising irradiating a microwave resonant medium with photon energy, applying microwave input energy to said medium at a frequency at which said medium is resonant, and deriving output energy from said medium at said resonant frequency at a rate equal to the sum of the rates at which energy is applied to and generated by said medium.

7. A method of amplifying electrical energy comprising, irradiating a microwave resonant medium with photon energy, applying a magnetic field to said irradiated medium, applying microwave input energy to said medium at a frequency at which said medium is resonant, and deriving output energy from said medium at said resonant frequency at a rate equal to the sum of the rates at which energy is applied to and generated by said medium.

8. A method of generating electrical energy comprising, irradiating a microwave resonant medium with photon energy to initiate the build-up of electromagnetic oscillations at a frequency at which said medium is resonant, and withdrawing electromagnetic energy from said medium at said resonant frequency at a rate which is slower than the rate of build-up of said electromagnetic oscillations.

9. A method of generating electrical energy comprising, irradiating a microwave resonant medium with photon energy to initiate the build-up of electromagnetic oscillations at a frequency at which said medium is resonant, applying a magnetic field to said irradiated medium, and withdrawing electromagnetic energy from said medium at said resonant frequency at a rate which is slower than the rate of build-up of said electromagnetic oscillations.

10. A method of utilizing a microwave resonant medium comprising, producing photon energy, utilizing said photon energy to irradiate a microwave resonant medium to produce photon induced transitions between quantum energy states of said medium, applying microwave input energy to said irradiated medium at a frequency at which said medium is resonant, and deriving microwave output energy from said medium at said resonant frequency.

11. A method of utilizing a microwave resonant medium comprising, producing photon energy, utilizing said photon energy to irradiate a microwave resonant medium, applying a magnetic field to said irradiated medium, applying microwave input energy to said medium at a frequency for which said medium is resonant, and deriving microwave output energy from said medium at said resonant frequency.

12. A method of utilizing a microwave resonant medium comprising, producing photon energy, utilizing said photon energy to irradiate a microwave resonant medium and a buffer gas mixed therewith, applying a magnetic field to said irradiated medium and buffer gas, applying microwave input energy to said medium at a frequency at which said medium is resonant, and deriving microwave output energy from said medium at said resonant frequency.

13. A method of utilizing a microwave resonant medium comprising, producing photon energy, utilizing said photon energy to irradiate a microwave resonant medium and a noble gas mixed therewith, applying a magnetic field to said irradiated medium and noble gas, applying microwave input energy to said medium at a frequency at which said medium is resonant, and deriving microwave output energy from said medium at said resonant frequency.

14. Microwave apparatus comprising, a microwave resonant medium, means for producing photon energy at a frequency at which said medium is resonant for irradiating said microwave resonant medium to produce photon induced transitions between quantum energy states of said medium, and means for applying microwave energy to and coupling microwave energy from said irradiated medium at a frequency for which said medium is resonant.

15. Microwave apparatus comprising, a microwave resonant medium, means for producing photon energy at a frequency at which said medium is resonant for irradiating said microwave resonant medium to produce photon induced transitions between quantum energy states of said medium, and means for providing electrical coupling to said medium.

16. Microwave apparatus comprising, a microwave resonant medium, means for producing photon energy at a frequency at which said medium is resonant for irradiating said microwave resonant medium to produce photon induced transitions between quantum energy states of said medium, means for applying a magnetic field to said irradiated medium, and means for providing electrical coupling to said medium.

17. Microwave apparatus comprising, a microwave resonant medium, means for producing photon energy at a frequency at which said medium is resonant for irradiating said microwave resonant medium to produce photon induced transitions between quantum energy states of said medium, means for applying a magnetic field to said microwave resonant medium, and means for applying microwave energy to and coupling microwave energy from said irradiated medium at a frequency for which said medium is resonant.

18. Microwave apparatus for producing an intensified spectral line comprising a microwave resonant medium, a photon source including a medium of the same type as said microwave resonant medium for irradiating said microwave resonant medium, and means for applying microwave energy to and coupling microwave energy from said irradiated medium at a frequency for which said medium is resonant.

19. Microwave apparatus for producing an intensified spectral line comprising a microwave resonant medium, a photon source including a medium of the same type as said microwave resonant medium for irradiating said microwave resonant medium, means for applying a magnetic field to said microwave resonant medium, and means for applying microwave energy to and coupling microwave energy from said irradiated medium at a frequency for which said medium is resonant.

20. Microwave apparatus for producing an intensified spectral line comprising a microwave resonant medium, a buffer gas mixed with said microwave resonant medium, a photon source including a medium of the same type as said microwave resonant medium for irradiating said microwave resonant medium, and means for applying microwave energy to and coupling microwave energy from said irradiated medium at a frequency for which said medium is resonant.

21. Microwave apparatus for producing an intensified spectral line comprising a microwave resonant medium, a noble gas mixed with said microwave resonant medium, a photon source including a medium of the same type as said microwave resonant medium for irradiating said microwave resonant medium, and means for applying microwave energy to and coupling microwave energy from said irradiated medium at a frequency for which said medium is resonant.

22. Microwave apparatus for producing an intensified spectral line comprising, a microwave resonant medium, means for applying a magnetic field to said microwave resonant medium with the lines of force of said magnetic field extending in a given direction, means for producing circularly polarized photon energy for irradiating said microwave resonant medium, and means for applying microwave energy to and coupling microwave energy from said irradiated medium at a frequency for which said medium is resonant.

23. Microwave apparatus for producing an intensified spectral line comprising, a microwave resonant medium, means for applying a magnetic field to said microwave resonant medium with the lines of force of said magnetic field extending in a given direction, means for producing unpolarized photon energy at a frequency at which said medium is resonant for irradiating said microwave resonant medium, and means for applying microwave energy to and coupling microwave energy from said irradiated medium at a frequency for which said medium is resonant.

24. Microwave apparatus for producing an intensified spectral line comprising, a microwave resonant medium, means for applying a magnetic field to said microwave resonant medium with the lines of force of said magnetic field extending in a given direction, means for irradiating said microwave resonant medium with plane polarized photon energy at a frequency at which said medium is resonant having an electric vector parallel to the lines of force of said magnetic field, and means for applying microwave energy to and coupling microwave energy from said irradiated medium at a frequency for which said medium is resonant.

25. Microwave apparatus for producing an intensified spectral line comprising, a microwave resonant medium, means for applying a magnetic field to said microwave resonant medium with the lines of force of said magnetic field extending in a given direction, means for irradiating said microwave resonant medium with plane polarized photon energy having an electric vector perpendicular to the lines of force of said magnetic field, and means for applying microwave energy to and coupling microwave energy from said irradiated medium at a frequency for which said medium is resonant.

26. Microwave apparatus comprising, a microwave resonant medium at a pressure not greater than $10^{-2}$ millimeters of mercury, means for producing photon energy at a frequency at which said medium is resonant for irradiating said microwave resonant medium to produce photon induced transitions between quantum energy states of said medium, means for applying a magnetic field to said microwave resonant medium, and means for applying microwave energy to and coupling microwave energy from said irradiated medium at a frequency for which said medium is resonant.

27. Apparatus as claimed in claim 26, including means for controlling the pressure of said microwave resonant medium.

28. Microwave apparatus comprising, a microwave resonant medium at a pressure not greater than $10^{-2}$ millimeters of mercury, a noble gas mixed with said microwave resonant medium, said noble gas being at a pressure at least two orders of magnitude greater than the pressure of said resonant medium, means for producing photon energy for irradiating said microwave resonant medium, means for applying a magnetic field to said microwave resonant medium, and means for applying microwave energy to and coupling microwave energy from said irradiated medium at a frequency for which said medium is resonant.

29. Microwave apparatus comprising, a non-magnetic cavity resonator, a confined microwave resonant fluid within said resonator at a pressure not greater than $10^{-2}$ millimeters of mercury, means for producing photon energy at a frequency at which said medium is resonant for irradiating said microwave resonant fluid, means outside said resonator for applying a magnetic field to said resonator and resonant fluid, and means for coupling microwave energy into and out of said resonator at a frequency for which said fluid is resonant.

30. Apparatus as claimed in claim 29 wherein said resonator is cylindrical and is operated in the $TE_{01}$ mode, and said photon excitation is introduced into said resonator through an aperture in a circular wall of said resonator.

31. Apparatus as claimed in claim 30 wherein the lines of force of said magnetic field are normal to the circular walls of said cylindrical resonator.

32. Apparatus as claimed in claim 31 including means for controlling the pressure of said microwave resonant fluid.

33. Apparatus as claimed in claim 29 wherein said resonator is cylindrical and is operated in the $TE_{01}$ mode, and said photon excitation is introduced into said resonator through the side wall of said resonator.

34. Apparatus as claimed in claim 33 including a polarizing screen between said photon source and said resonator.

35. Apparatus as claim in claim 34 wherein said polarizing screen is oriented so that the electric vector of said photon energy is perpendicular to the lines of force of said magnetic field.

36. Apparatus as claimed in claim 34 wherein said polarizing screen is oriented so that the electric vector of said photon energy is parallel to the lines of force of said magnetic field.

37. Apparatus as claimed in claim 18 wherein said microwave resonant medium is sodium vapor.

38. Apparatus as claimed in claim 18 wherein said microwave resonant medium is cesium vapor.

39. A microwave amplifier comprising, a microwave resonant medium, means for producing photon energy at a frequency at which said medium is resonant for irradiating said microwave resonant medium, and means for applying microwave input energy to said medium at a frequency at which said medium is resonant and withdrawing from said medium amplified microwave input energy at said resonant frequency.

40. A microwave amplifier comprising, a microwave resonant medium, means for producing photon energy at a frequency at which said medium is resonant for irradiating said microwave resonant medium, means for applying a magnetic field to said irradiated medium, and means for applying microwave input energy to said medium at a frequency at which said medium is resonant and withdrawing from said medium amplified microwave input energy at said resonant frequency.

41. A microwave oscillation generator comprising, a microwave resonant medium, means for producing photon energy at a frequency at which said medium is resonant for irradiating said microwave resonant medium to initiate the build-up of electromagnetic oscillations, and means for withdrawing electromagnetic energy from said medium at said frequency at a rate which is slower than the rate of build-up of said electromagnetic oscillations.

42. A microwave oscillation generator comprising, a microwave resonant medium, means for producing photon energy at a frequency at which said medium is resonant for irradiating said microwave resonant medium to initiate the build-up of electromagnetic oscillations, means for applying a magnetic field to said irradiated medium, and means for withdrawing electromagnetic energy from said medium at said frequency at a rate which is slower than the rate of build-up of said electromagnetic oscillations.

43. Apparatus as claimed in claim 15, said microwave resonant medium comprising a fluid.

44. Apparatus as claimed in claim 15, said microwave resonant medium comprising a gas.

45. Apparatus as claimed in claim 15, said microwave resonant medium comprising a vapor.

46. Apparatus as claimed in claim 15, said microwave resonant medium comprising a solid at room temperature and pressure.

References Cited in the file of this patent

UNITED STATES PATENTS

| | | |
|---|---|---|
| 2,705,284 | Hershberger | Mar. 29, 1955 |
| 2,707,235 | Townes | Apr. 26, 1955 |